Feb. 18, 1958     E. MADARAS ET AL     2,824,166
SOLDERLESS ELECTRICAL CONNECTORS AND JUNCTION BLOCKS
Filed June 25, 1953     2 Sheets-Sheet 1
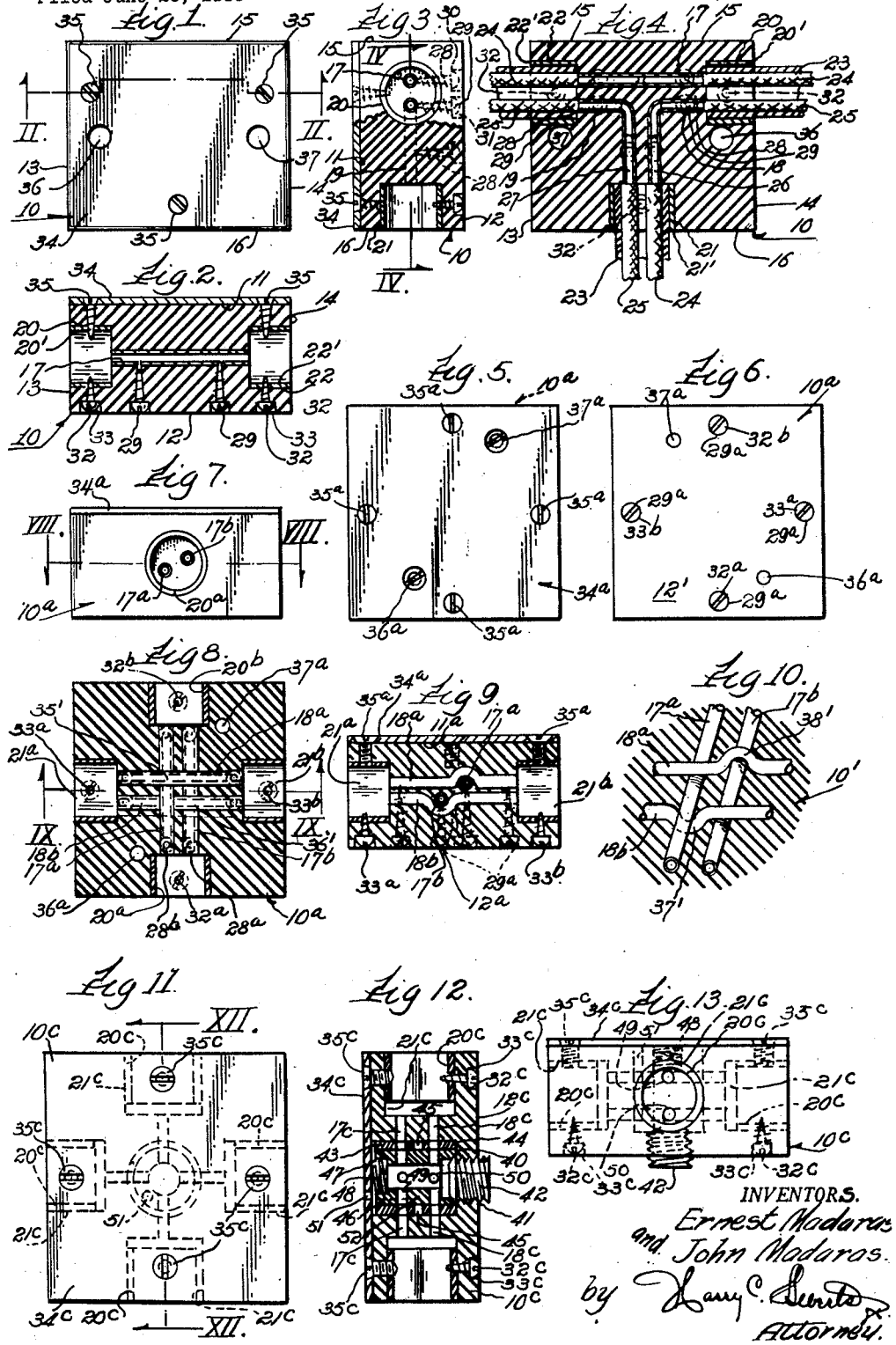
INVENTORS.
Ernest Madaras
and John Madaras
by Larry C. Demito
Attorney.

Feb. 18, 1958   E. MADARAS ET AL   2,824,166
SOLDERLESS ELECTRICAL CONNECTORS AND JUNCTION BLOCKS
Filed June 25, 1953   2 Sheets-Sheet 2
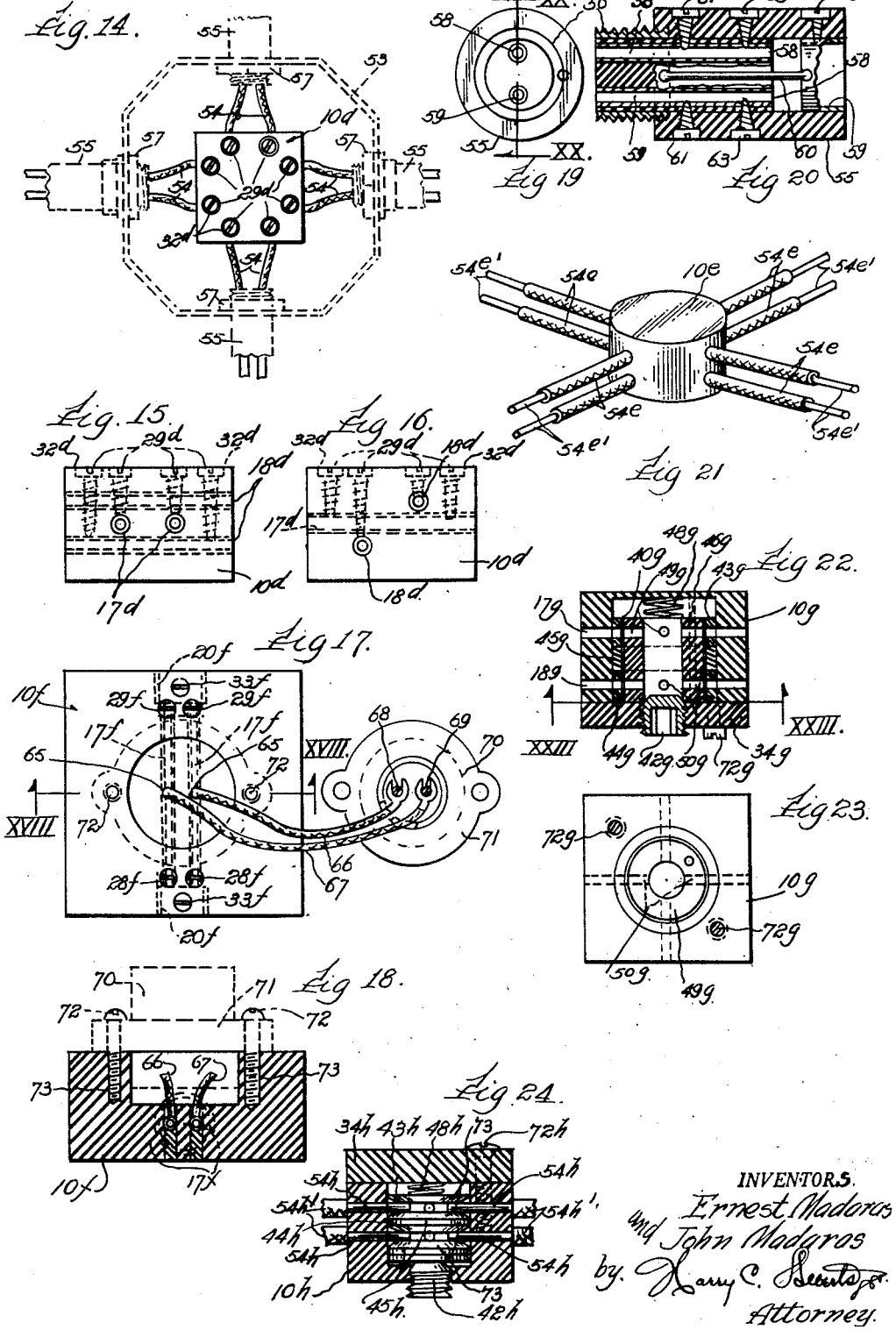
INVENTORS.
Ernest Madaras
and John Madaras
by Harry C. Seeuts Jr.
Attorney.

United States Patent Office 2,824,166
Patented Feb. 18, 1958

2,824,166

SOLDERLESS ELECTRICAL CONNECTORS AND JUNCTION BLOCKS

Ernest Madaras and John Madaras, Chicago, Ill.

Application June 25, 1953, Serial No. 364,068

2 Claims. (Cl. 174—59)

This invention relates to solderless electrical wiring connectors and more particularly to junction connectors for enabling the electrical and physical connection of wires without resort to the cumbersome expedients of stripping insulation, twisting and soldering and then re-taping which entails a great deal of time, labor and expense, although certain features thereof may be employed with equal advantage for other purposes. This application is a continuation-in-part of copending application Serial No. 318,179 and filed November 1, 1952.

It contemplates more especially the provision of an improved and simplified junction connector for electrically and physically connecting wires without requiring each individual wire lead to be stripped, twisted and soldered and then re-taped so that the customary junction box may be either dispensed with or a junction connector used therewith to eliminate the cumbersome and time consuming labor of preparing the wires for connection and effecting their permanent joinder by soldering which is an accepted standard and a requirement of all building codes.

In wiring building structures such as homes, industrial plants, stores, vehicles such as buses, train cars and airplanes, there are innumerable lights on a single circuit and each of these now require a metallic junction box wherein wires are connected by stripping the insulation from their ends, twisting the bare wire ends that are intended for electrical connection, soldering the connected wires to effect a permanent connection and then re-taping. This is a customary requirement of most electrical codes and entails a great deal of material as well as labor which is extremely expensive. Much of this labor and expense can be eliminated by providing an improved junction connector that does not require any twisting or soldering and for that matter wires can be effectually connected together without even stripping the insulation from their ends. This has been accomplished by embedding or associating a plurality of spaced tubes within a dielectric such as plastics and to provide means for retaining the wires in electrical as well as physical connection with these metallic tubes preferably though not essentially copper.

With the teachings of the present invention, conduit or armored BX can be directly connected to the junction connector, and the wires therein joined to the wires to establish the desired circuit and switching arrangement without resort to the usual requisites of stripping the insulation from the wire ends, twisting the wires together, soldering the twisted wires and then re-taping the connection to properly insulate it against short circuiting or grounding.

One object of the present invention is to simplify the construction and improve the operation of devices of the character mentioned.

Another object is to provide an improved junction connector embodying prearranged metallic circuit bridging elements to which wires can be electrically and physically connected without resort to twisting, soldering and the usual requirement of re-taping.

Still another object is to provide an improved non-metallic junction connector having metallic circuit bridging elements embedded therein to which electrical wires can be directly connected without insulation stripping, twisting, soldering, and the usual requirement of re-taping.

A further object is to provide an insulator block having preformed electrical circuit bridging elements to which electrical wires from any source can be connected for joinder without resort to twisting, soldering and taping.

A still further object is to provide an insulated junction connector having preformed and arranged circuit bridging elements therein with expedients for connecting conduit or armored BX thereto and effecting their connection without resort to any manual expedient such as twisting, soldering and re-taping which entails a great deal of time, labor and expense.

Still a further object is to provide a simple and effective preformed means for establishing the junction of the different wires of electrical circuits without the cumbersome requirements of insulation stripping, twisting the bare ends of the wire, soldering the bare twisted ends of the wire and re-taping the soldered wires for insulation and prevention against grounding.

Other objects and advantages will appear from the following description of an illustrative embodiment of the present invention.

In the drawings:

Figure 1 is a top plan view of a three connector junction box embodying features of the present invention.

Figure 2 is a sectional view in elevation taken substantially along line II—II of Figure 1.

Figure 3 is a partial side sectional view in elevation of the block shown in Figures 1 and 2.

Figure 4 is a sectional view in elevation taken substantially along line IV—IV of Figure 3.

Figure 5 is a plan view of a modified form of the invention showing a four connector junction box embodying features of the present invention.

Figure 6 is a bottom plan view of the junction box connector shown in Figure 5.

Figure 7 is a side view in elevation of the junction box connector shown in Figures 5 and 6.

Figure 8 is a sectional plan view taken substantially along the line VIII—VIII of Figure 7.

Figure 9 is a sectional view in elevation taken substantially along line IX—IX of Figure 8.

Figure 10 is an enlarged detailed view showing the manner in which the bridging elements in the junction box connectors of Figures 8 and 9 are joined and spaced to provide the desired circuit arrangements.

Figure 11 is a plan view of a still further modified embodiment of the four connector junction box of the type illustrated in Figures 5-9.

Figure 12 is a sectional side view in elevation taken substantially along line XII—XII of Figure 11.

Figure 13 is a side view in elevation of the junction box connector shown in Figures 11 and 12.

Figure 14 is a still further modified embodiment of the junction box connector utilized with a standard metal junction box.

Figure 15 is a side view in elevation of the junction box connector shown in Figure 14.

Figure 16 is an end view in elevation of the junction box connector shown in Figures 14 and 15.

Figure 17 is a plan view of a still further modified embodiment of a junction box having provision for a light socket attachment thereto, the light socket being shown detached for clarity.

Figure 18 is a sectional view in elevation taken substantially along line XVIII—XVIII of Figure 17 with the light socket shown in operative dotted line position.

Figure 19 is an end view in elevation of a plug of the type utilized in conjunction with the metallic junction box illustrated in dotted lines in Figure 14 and shown with more detail in my above identified copending application.

Figure 20 is a sectional view in elevation taken substantially along line XX—XX of Figure 19.

Figure 21 is a perspective view of a simplified junction box connector that can be utilized with the plugs shown in Figures 19 and 20 and capable of use with a standard metallic junction box.

Figure 22 is another form of junction box connector embodying features of the present invention and capable of being utilized with a standard metallic junction box.

Figure 23 is a bottom plan view of the junction box connector shown in Figure 22.

Figure 24 is a sectional view in elevation of a still further modified embodiment of the junction box connector shown in Figures 22 and 23.

The structure selected for illustration is not intended to serve as a limitation upon the scope or teachings of the invention, but is merely illustrative thereof. There may be considerable variations and adaptations of all or part of the teachings depending upon the dictates of commercial practice. The present embodiment comprises any suitable shape of block 10 preferably of suitable plastic material or any dielectric which is not a conductor of electricity, in this instance of substantially rectangular configuration to present a top and bottom surface 11—12 and opposite pairs of side walls 13—14 and 15—16. The block 10 may be molded or otherwise shaped from the dielectric material so as to provide therein any suitable arrangement of cylindrical tubes of a metallic material such as copper which is a good conductor of electricity in this instance a straight tube 17 and two right angular bent tubes 18—19 which communicate with cylindrical recesses 20—21—22 lined by metallic sleeves 20'—21'—22' which are molded with the plastic or dielectric material from which the block 10 is formed.

The sleeves 20'—22' are molded in opposed spaced walls 13—14 (Figure 4) in axial alignment while the sleeve 21' is disposed and embedded in the wall 16 along the central median line of the block 10 so that the straight metallic tube 17 communicates with the axially aligned sleeves 20'—22' and the three sleeves 20'—21'—22' are connected for communication by the right angular metallic tube 18 extending between the sleeves 20'—21' and the right angular tube 19 extending between the sleeves 21'—22', thereby establishing a pre-wired switch connector block with the right angular tubes 18—19 serving as the interrupted circuit switch wire with the sleeve 21' serving as the switch connector sleeve as will more fully hereinafter appear. With this arrangement, wire receiving conduit or armored BX two wire cable 23 can be inserted in the switch connector sleeve 21' so that the wires 24—25 thereof either extend directly into the legs of the right angular tubes 18—19 without stripping the insulation therefrom (not shown) or by stripping the ends of the wires 24—25 to provide bare ends 26—27 for insertion in the tubes 18—19. The option of stripping the ends 26—27 of the insulated wires 24—25 or inserting them directly into the ends of the tubes 26—27 depends upon the dictates of commercial practice, the building code restrictions and the size of the wire in that there are some thin insulated covered wires that are sufficiently small in diameter for insertion directly into the tubes 26—27 while others are of somewhat thicker diameter which would preclude their direct insertion and would have to be stretched.

Of course, the tubes 17—18—19 could be made sufficiently large to accommodate both sizes of electrical conducting wires, and electrical conduction between the wires 24—25 and the tubes 17—18—19 established by means of self-threading metallic screws 28—29 that are displaced through counter-sink apertures 30—31 provided in the bottom 12 of the block 10 (Figure 2) to establish contact with the wires extending through the copper tubes 17—18—19 to engage and retain the wire ends 26—27 in both electrical and physical connection therewith irrespective of whether or not the ends 26—27 of conductor wires 24—25 are stripped or inserted with their insulation.

Similarly, self-threading screws 32 project through counter-sunk apertures 33 in the block 10 in alignment with the metallic sleeves 20'—21'—22' for connection therewith and to extend therethrough to engage the conduit or armored BX cable sheath 23 in order to retain such in physical connection therewith against accidental withdrawal from the sleeves 20'—21'—22' and these are all grounded together by means of a metallic top plate 34 shaped to conform with the top 11 of the block 10 for connection thereto by means of self-threading screws 35 that also engage the sleeves 20'—21'—22' (Figure 2) so that they will be connected together and grounded through the conduit or sheath of the armored cable 23 which is also grounded as part of the electrical system. In order to mount the block 10 to any part of the structure, spaced holes 36—37 are provided entirely through the block 10 and the metallic cover plate 34 thereof for the reception of long wood screws that project therebeyond for mounting to any suitable surface.

With this arrangement and pre-wired block 10, the wires leading from the switch would be inserted into the sleeve 21' with the power input wires connected to the sleeve 22' and the wires leading to the light or other electric device for control through a switch connected to the sleeve 20'. This would enable the switch type block 10 to be utilized without a junction box and by markings on the block itself the desired nomenclature could be impressed thereon so that even the novice could utilize the pre-wired block 10 to control a light, motor or other electrical device through a switch. This can be effected without twisting wires, soldering or even stripping the insulation from the ends 26—27 should commercial practice so dictate and the building code provisions permit. It should be noted that another outlet sleeve similar to the sleeves 20'—21'—22' could be provided on the side 15 of the block 10 for connection through tubes so that another power outlet could be provided thereon that is not controlled by the switch wires inserted in the sleeve 21'. This is one arrangement of utilizing a connector block without resort to insulation stripping, wire end twisting, soldering and the usual metallic junction box.

In Figures 5 to 10 inclusive there is shown a modified embodiment of the above invention which takes the form of a connector block having one power input and three power outputs and without any switch involved. This involves a pre-wired connector block wherein the dielectric preformed plastic rectangular block 10a is provided with two pairs of spaced parallel copper or other metallic tubes 17a—17b and 18a—18b with one leg of each pair in physical contact by spot welding or otherwise joining as at 35'—36' so that tubular legs 17a—18a and 17b—18b are electrically connected for conduction with the leg 17a spaced from the leg 18b by an offset curve 37' therein (Figure 10) and the leg 18b spaced from the leg 18a by an upwardly offset curve 38' in the tube 18a (Figures 9 and 10). In this manner, the tubes 17a—17b and 18a—18b communicate with opposed and axially aligned sleeves 20a—20b and 21a—21b to communicate therewith so that conduit or armored BX cable may be inserted therein for retention by self-threading set screws 32a—32b and 33a—33b. The ends of the insulated wires within the conduit or armored BX are inserted within the tube ends 17a—17b and 18a—18b for retention and to establish electric contact with the tubes by means of the self-threading set screws 28a—28b which extend through counter-sunk recesses 29a to engage each of the tubes proximate to the openings 20a where the sleeves 20b are inserted and molded with the tubes 17a—17b and 18a—18b in the formation of the connector block 10a with any suitable plastic which is a dielectric, will withstand impact and is non-inflammable. A metallic cover plate 34a is attached to the surface 11a by means of suitable screws such as the machine screws 35a that engage correspondingly threaded apertures in the sleeves 20a. Self-threading screws 33a also engage the sleeves 21a in the manner described supra by projecting through openings communicating with the opposite wall 12a of the block 10a.

With this arrangement, any one of the sleeves 20a can be utilized as a power input and the three remaining sleeves 20a serve as power outputs with the entire block 10a attachable by providing long screws through the openings 36a—37a. The connecting block 10a thus serves as a pre-wired junction box without requiring any of the wire ends to be stripped, twisted, soldered and re-taped to insulate them from each other and the ground. The tedious and time consuming labors heretofore required in these manual operations are entirely eliminated and a connector block provided which can be used without any of the cumbersome manual operations incident to the use of metallic junction boxes of standard construction.

In the further modified embodiment illustrated in Figures 11 to 13 inclusive the connector block 10c is of corresponding shape and size, and the usual opposed sleeves 20c are molded or press-fitted in openings 21c to communicate with superposed parallel spaced pairs of wire receiving passages 17c—18c which extend to and communicate with an axial well or recess 40 which has a centrally threaded aperture 41 communicating therewith to receive a correspondingly threaded set screw 42 having an Allen socket therein for turning by a correspondingly shaped wrench in the customary manner. A pair of cylindrical metallic sleeves 43—44 are provided in the axial well or recess 40 and these are spaced from each other as at 45 to avoid contact. A dielectric cylinder plug 46 is disposed for longitudinal movement within the axial spaced sleeves 43—44 and the plug 46 has an axial recess 47 therein to receive a standard compression spring 48 that engages the underside of the top metallic plate 34c which grounds the four sleeves 20c through the machine's groove fasteners 35c. The opposed surface 12c of the block 10c is provided with self-threading screws 32c that extend in counter-sunk openings 33c to engage the four sleeves 20c, thereby retaining a conduit or armored BX disposed therein position against accidental removal and completing the ground of all of them through the top plate 34c.

It should be noted that the spaced sleeves 43—44 together with the cylinder plug 46 have radial disposed pairs of passages 49—50 therein conforming to and in registry with the passages 17c—18c so that the stripped ends of the insulated wires within the conduit or armored BX may project through the passages 17c—18c and the aligned and radial apertures 49—50 within the dielectric cylinder plug 46 through the intermediary corresponding apertures within the metallic axial sleeves 43—44, thereby keeping them aligned when the spring 48 is in its normally expanded position and the axial dielectric plug 46 is at the bottom of the well or recess 40 and engageable by the axial set screw 42. Upon turning the axial set screw 42 so as to move inwardly toward the central well or recess 40, the axial dielectric plug 46 will be displaced in the direction of the top metallic plate 34c and thus compress the spring 48 to deflect the ends of the stripped wires in a corresponding direction and thus establish electric conductive contact with the sleeves 43—44, thereby connecting the wires therein in parallel so that one of the four sleeves 20c may be used as a power input and the other remaining three as power outputs in a manner identical to the connector block construction shown in the previous embodiment illustrated in Figures 5 to 10 inclusive. To avoid the central dielectric plug 46 from turning so that the passages 49—50 therein will not move out of registry, a pin 51 extends from the metallic plate 34c inwardly to register with a somewhat larger aperture 52 provided in the central dielectric plug 46 to maintain the central plug in true alignment regardless of its displacement by the spring 48 in one direction or the axial set screw 42 in the opposite direction.

With this arrangement, a pre-wired connector block is provided which may be utilized by inserting the conduit or armored BX with stripped ends of the insulated wire projected in the apertures provided in each of the end surface recesses 21c, and electrically connecting them in parallel by simply rotating the axial set screw 42.

In the modified embodiment illustrated in Figures 14 to 20 inclusive, the standard metallic octagonal junction box 53 is utilized in conjunction with a modified connector block 10d wherein two pairs of straight tubes 17d are disposed to project therethrough in a common plane substantially midway between the block 10d. Another pair of metallic tubes 18d extend through the block 10d in a direction normal to the tube 17d and one spaced below and the other spaced thereabove so that each of the pairs of tubes 17d and 18d will be fully insulated by the dielectric material such as the plastic from which the connector block 10d is molded or otherwise shaped, and four pairs of insulated wires 54 have their ends projecting into the opposite ends of the tubes 17d—18d with self-threading or tapping screws 29d projecting through counter-sunk openings 32d of the proper length to engage the copper or metallic tubes 17d—18d and have their points impinge against the copper cores of the insulated wires 54 to establish the connection of the correspondingly colored wires of each pair to electrically connect them in parallel for corresponding connection to a plug 55 which constitutes the subject matter of my previously filed patent application identified supra. The plugs 55 have a threaded reduced end for reception in the blanked openings provided in the standard junction box 53 for mounting therein by means of correspondingly threaded nuts 57 that hold the plugs 55 in position. The plugs each have a pair of correspondingly sized copper or other metallic tubes 58 or 59 extending therethrough to receive the other ends of the insulated wires 54 for connection with a sleeve 59 axially disposed in the other end of the plug 55. A jumper wire 60 deflects the sleeve 59 to the metallic threaded shoulder 56 that is contacted through the metal nut 57 with the metallic junction box 53. The wires 54 extend into the tubes 58 for connection therewith through the self-threading screws 61. Another self-threading screw 62 engages the sleeve 59 to retain the conduit or armored BX therein so that the wires leading therefrom may enter the tubes 58 through the sleeve end for connection by another set of self-threading screws 63 provided to engage the tubes 58 similarly to the self-threading screws 61 that connect the wires leading from the connector block 10d.

With this arrangement, a standard junction box 53 may be utilized without resorting to the usual manual operations of stripping the ends of the insulated wire, twisting the ends together, soldering and then re-taping, which is entirely dispensed with with the teachings of the present invention.

The connector block 10d may be substituted by a pre-molded connector block 10e (Figure 21) which has radially extending pairs of wires 54e connected together within the dielectric 10e preparatory to the molding of the latter, and this entire fabricated connector 10e with its radially extending pairs of wires 54e is capable of use in the manner precisely as described in the previous embodiment illustrated in Figures 14, 15, 16, 19 and 20. This prefabricated connector 10e with its permanently embedded wires 54e is much cheaper in construction and will serve the same purpose as the connector block 10e.

It should be observed that the pairs of wires 54e will be colored to correspond with the usual identifying colors such as black and white and in practice the ends need not be stripped as shown at 54e' in that the self-threading or tapping screws 61—63 penetrate through the insulation and engage the bare wire 54e' to establish a permanent and effective physical and electrical connection with the use of the plug illustrated and described in Figure 20.

In the further modified embodiment disclosed in Figures 17 and 18 a connector block 10f is provided of suitable dielectric material with a pair of opposed metallic sleeves 20f provided in opposed parallel surfaces for connection through a pair of metallic tubes 17f and provided with opposite pairs of self-threading screws 28f and 29f and corresponding self-threading screws 33f extending through the sleeves 20f to retain and engage conduit or armored BX therein with the ends of the insulated wires projecting within the tubes 17f for engagement with both ends by the self-threading screws 28f—29f so that one sleeve receptacle may serve as a power input and the other as power output. The insulated wires may be extended from one or the other of the sleeves 20f so as to project through openings 65 provided in the tube 17f at substantially their central position to provide leads 66—67 that may be connected through two terminals 68—69 provided on a standard light receptacle 70 such as the usual porcelain light receptacle. The light receptacle 70 is usually provided with a flange 71 through which long threaded studs 72 may project to engage correspondingly threaded apertures 73 provided in the dielectric connector block 10f.

With this arrangement, there would be a power input and a power output together with a light bulb receptacle 70 provided in the connector block 10f for utilization in place of a standard metal junction box illustrated in Figure 14.

In the modified embodiment illustrated in Figures 22 and 23, a connector block 10g is provided which utilizes the teachings of the central structural features of Figures 11 to 13, inclusive, and omits the conduit or armored BX connecting sleeves so that the connector block 10g could be utilized with a standard junction box 53 illustrated in Figure 14. The connector block 10g is formed or shaped to provide a central well 40g which has metallic sleeves 43g—44g molded therein and spaced from each other by a dielectric spacer ring 45g. Intersecting pairs of passages 17g—18g are provided in the connector block 10g to extend from all four sides thereof to the axial well 40g for registry with correspondingly sized passages 49g—50g provided in a central dielectric plug 46g which is spaced from the bottom of the well 40g by means of a standard compression spring 48g. A plate 34g is disposed on the connector block 10g to cover the axial well 40g and is held thereon by means of threaded fasteners 72g, in this instance two. An axial set screw 42g with an Allen wrench recess therein is threaded to the cover plate 34 to make contact with the central plug 46g for displacement in the direction of the spring 48g, thereby deflecting the stripped ends of wires and thus establish physical and electrical contact with the metallic space rings 43g—44g for electrically connecting the proper wires together. This structure could be utilized as a substitute for the connector blocks 10d and 10e described in the embodiments illustrated in Figures 14 to 21; however, a single axial set screw 42g serves to establish the electrical connection of the proper wires at a junction outlet without using separate screws 29d illustrated in Figure 14 or utilizing the pre-molded and permanently connected wires of the modified connector 10e shown in Figure 21.

In the still further modified embodiment illustrated in Figure 24 the exact electrical connector block of Figures 22 and 23 is involved except that the spaced metallic sleeves 43g—44g are dispensed with and opposed pairs of removable metallic washers 43h—44h are provided. The opposed pairs of metallic washers 43h—44h are champered to present confronting convergingly inclined peripheral surfaces 73 to freely receive the stripped ends 54h of the insulated wires 54h'. The opposed pairs of metallic washers 43h—44h are spaced from each other by means of a dielectric collar 45h, and a spring 48h urges these together against a set screw 42h threaded in a correspondingly sized axial aperture provided in the dielectric connector block 10h. A cover plate 34h is retained and attached to the block 10h by means of a pair of fasteners 72h.

This arrangement permits wires to be connected thereto without twisting or soldering or taping, and the metallic connecting sleeves or washers need not be molded in the block 10h as in the previously described embodiment. The connector block 10h may be utilized with a standard junction box 53 and the plugs 55 provided as illustrated in Figure 20 for mounting in each or any of the desired blanked openings provided as a standard expedient in the metallic junction box 53. It should be noted that after the fasteners 29—30—35 (Figures 1 to 4, inclusive), 29a—30a—33a (Figures 8 and 9), 32c (Figures 11 to 13, inclusive), 29d—30d—32d (Figures 14, 15 and 16) are in operative position the countersunk openings that communicate with the exterior of the body members 10, 10a, 10b, 10c, 10d and 10f and which accommodate the heads of the abovementioned fasteners, are filled with suitable insulating materials such as a liquid plastic or a sealing wax to avoid electrical contact with the fastener heads, thereby precluding any short circuiting or undesirable electrical contact therewith.

With the arrangement of parts above described, it will be apparent that a variety of connector blocks have been provided that will dispense with twisting, soldering, taping and in some instances with stripping the insulation from the ends of the wires. The material expenses can be minimized and much of the labor involved in electrical wiring eliminated in homes, industrial plants, schools and wherever series of lights or other electrical devices are provided in a circuit or series of circuits.

While we have illustrated and described a preferred embodiment of this invention, it must be understood that the invention is capable of considerable variation and modification without departing from the spirit of the invention. We, therefore, do not wish to be limited to the precise details of construction set forth, but desire to avail ourselves of such variations and modifications as come within the scope of the appended claims.

We claim:

1. A connector block for joining electrical wires comprising a solid integral dielectric body member, pairs of internal electrical conductors molded in the body of said dielectric body member having radially disposed branches extending to different positions proximate to the exterior of said body member, there being openings in said body member to communicate with said radially disposed branches of said electrical conductors, sleeves in said last named openings to receive steel protective electric wire covers therein, a metallic grounding plate associated with said body member for electrical connection to said sleeves to provide a common ground therebetween, and external pointed screw threaded wire insulation piercing means projecting through a surface of said body member to engage the insulated wire ends in said internal electrical conductors and the steel protective electric wire covers for physically and electrically securing external electrical wires to said internal electrical conductors in said body member.

2. A connector block for joining electrical wires comprising a solid integral dielectric body member, pairs of internal electrical tubular wire receiving conductors molded in the body of said dielectric body member having radially disposed branches extending to different positions proximate to the exterior of said body member, there being openings in said body member to communicate with said radially disposed branches of said electrical conductors, sleeves in said last named openings to receive steel protective electric wire covers therein, a metallic grounding plate associated with said body member for electrical connection to said sleeves to provide a common ground therebetween, and external pointed screw threaded wire insulation piercing means projecting through a surface of said body member to engage the insulated wire ends in said internal electrical tubular wire receiving conductors and the steel protective electric wire covers for physically and electrically securing external electrical wires to said internal electrical tubular wire receiving conductors in said body member.

References Cited in the file of this patent

UNITED STATES PATENTS

| | | |
|---|---|---|
| 353,984 | Smith | Dec. 7, 1886 |
| 2,427,965 | Henderson | Sept. 23, 1947 |
| 2,574,608 | Ziph | Nov. 13, 1951 |
| 2,707,774 | Keller | May 3, 1955 |